(12) United States Patent
Lammel et al.

(10) Patent No.: US 10,048,066 B2
(45) Date of Patent: Aug. 14, 2018

(54) CONTROL DEVICE AND METHOD FOR OPERATING A CONTROL DEVICE

(71) Applicant: Robert Bosch GmbH, Stuttgart (DE)

(72) Inventors: Gerhard Lammel, Tuebingen (DE);
Frederik Wegelin, Reutlingen (DE);
Martina Foerster, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 684 days.

(21) Appl. No.: 14/375,076

(22) PCT Filed: Feb. 1, 2013

(86) PCT No.: PCT/EP2013/052074
§ 371 (c)(1),
(2) Date: Jul. 28, 2014

(87) PCT Pub. No.: WO2013/113896
PCT Pub. Date: Aug. 8, 2013

(65) Prior Publication Data
US 2015/0084435 A1    Mar. 26, 2015

(30) Foreign Application Priority Data

Feb. 2, 2012    (DE) .......................... 10 2012 201 498

(51) Int. Cl.
*H01H 35/14*    (2006.01)
*G01B 21/22*    (2006.01)
(Continued)

(52) U.S. Cl.
CPC .............. *G01B 21/22* (2013.01); *G01P 15/18* (2013.01); *G01V 7/02* (2013.01); *G05G 1/08* (2013.01);
(Continued)

(58) Field of Classification Search
CPC ......... G01P 15/18; G01P 15/00; G01B 21/16; G01B 21/22; G06F 3/02; G06F 3/033; G06F 3/038; G06F 15/00; G06F 19/00; G01D 18/00; G06K 9/00
USPC ........ 307/121, 119, 120, 9.1, 10.1, 10.2, 66, 307/64, 80, 43; 702/104, 141, 151; 345/157, 168; 382/154, 106
See application file for complete search history.

(56) References Cited

U.S. PATENT DOCUMENTS 5,854,622 A    12/1998  Brannon
6,580,415 B1    6/2003  Kato et al.
(Continued)

FOREIGN PATENT DOCUMENTS

EP    0 842 822    5/1998
JP    2006-348513 A    12/2006
(Continued)

*Primary Examiner* — Rexford Barnie
*Assistant Examiner* — Jagdeep Dhillon
(74) *Attorney, Agent, or Firm* — Norton Rose Fulbright US LLP; Gerard Messina

(57) ABSTRACT

A control device, in particular for an electrical or electronic device, which has a base element and an actuating element which is manually rotatable in relation to the base element about an actuation axis, the control device further having a sensor unit for detecting a movement of the actuating element about the actuation axis, the sensor unit further including an acceleration sensor.

22 Claims, 2 Drawing Sheets

(51) Int. Cl.
*G05G 1/08* (2006.01)
*G01P 15/18* (2013.01)
*G06F 3/0362* (2013.01)
*G01V 7/02* (2006.01)
*H01H 3/32* (2006.01)
*H01H 19/14* (2006.01)
*G01C 3/08* (2006.01)
*G01P 15/00* (2006.01)

(52) U.S. Cl.
CPC .......... *G06F 3/0362* (2013.01); *H01H 3/32* (2013.01); *H01H 19/14* (2013.01); *G01C 3/08* (2013.01); *G01P 15/00* (2013.01); *Y10T 307/799* (2015.04)

(56) References Cited

U.S. PATENT DOCUMENTS

| | | | | |
|---|---|---|---|---|
| 6,823,279 | B1* | 11/2004 | Nadkarni | G01P 21/00 702/104 |
| 7,224,263 | B2* | 5/2007 | Maehara | B60R 21/0132 307/10.2 |
| 2007/0104353 | A1* | 5/2007 | Vogel | G01C 1/04 382/106 |
| 2008/0120057 | A1* | 5/2008 | Fukushima | G01D 18/00 702/104 |
| 2009/0138233 | A1* | 5/2009 | Kludas | G01C 15/00 702/158 |
| 2009/0187371 | A1* | 7/2009 | Ohta | A63F 13/06 702/151 |
| 2009/0230338 | A1* | 9/2009 | Sanders | G05B 19/39 251/129.01 |
| 2009/0240461 | A1* | 9/2009 | Makino | A61B 5/1123 702/141 |
| 2010/0033422 | A1* | 2/2010 | Mucignat | G06F 1/1626 345/156 |
| 2010/0309123 | A1* | 12/2010 | Sawai | G06F 3/0346 345/157 |
| 2011/0161043 | A1* | 6/2011 | Semmelrodt | G01P 13/00 702/141 |
| 2011/0279373 | A1* | 11/2011 | Yokoyama | G06F 1/1616 345/168 |
| 2011/0282620 | A1* | 11/2011 | Sakuraoka | G01C 21/12 702/141 |
| 2013/0085711 | A1* | 4/2013 | Modi | G01C 22/006 702/141 |

FOREIGN PATENT DOCUMENTS

| | | |
|---|---|---|
| JP | 2008 277213 | 11/2008 |
| JP | 2011 059891 | 8/2010 |
| WO | 2006/090197 A1 | 8/2006 |
| WO | 2010/113608 | 10/2010 |

* cited by examiner

CONTROL DEVICE AND METHOD FOR OPERATING A CONTROL DEVICE

FIELD OF THE INVENTION

The present invention is directed to a control device.

BACKGROUND INFORMATION

Such control devices are believed to be generally understood. For example, a control knob, which has an actuating element which is rotatable in relation to a housing, is discussed in EP 0 842 822 A2. Such rotary knobs are used, for example, in car radios and the like. Normally, the actuating element is mechanically coupled to a potentiometer, the rotary position of the rotary knob being converted by the potentiometer into a corresponding electrical signal in order, for example, to set the sound volume of the car radio with the aid of the rotary knob. It is disadvantageous that potentiometers have sliding contacts that wear away over time.

SUMMARY OF THE INVENTION

The control device according to the present invention and the method according to the present invention for operating a control device as recited in the other independent claims have the advantage over the related art that, on the one hand, no sliding contacts subject to wear are required and, on the other hand, a comparatively cost-effective and power-saving control device is implemented. These advantages are achieved by using the acceleration sensor as a sensor unit, since the acceleration sensor is a comparatively economical, compact and power-saving component, which is subject to practically no wear. When the acceleration sensor is used, a minimum amount of force is required for rotating the actuating element, making more convenient control possible.

Furthermore, the acceleration sensor makes it possible to measure more precisely the rotary movement of the actuating element in relation to the base element. This makes it possible in particular to control an electrical and/or electronic device, for example, an audio device, a computer, a communication device, a navigation device, an electronic vehicle control system or the like, sensor signals of the acceleration sensor being used as control signals for the electrical and/or electronic device. The acceleration sensor includes in particular a micromechanical acceleration sensor configured as a MEMS component (Micro-Electro-Mechanical System), which is manufactured in a standard semiconductor manufacturing process. The acceleration sensor may have a substrate, in particular a silicon substrate, and a seismic mass which is suspended movably in relation to the substrate with the aid of springs.

In the case of an external acceleration acting on the sensor, the seismic mass is deflected in relation to the substrate due to inertial forces, the deflection being evaluated capacitively. In particular, a change in capacitance caused by the deflection between substrate-fixed solid electrodes and corresponding counter-electrodes of the seismic mass is converted into a sensor signal proportional to the deflection.

Advantageous embodiments and refinements of the present invention may be derived from the subclaims as well as the description with reference to the drawings.

According to one specific embodiment, it is provided that the acceleration sensor includes an at least biaxial acceleration sensor, whose sensing axes run in a sensing plane perpendicular to the actuation axis, the sensing plane running essentially parallel to the gravitational field of the control device in the use case. The acceleration sensor then measures in particular the direction of the gravitational field of the earth within the sensing plane. When the actuating element is rotated, only the sensing plane rotates, while the orientation of the gravitational field remains constant. The rotation of the actuating element is registered in that the direction of the gravitational field in the reference system of the acceleration system (and within the sensing plane) migrates about the actuation axis. With regard to the sensing plane, the actuation axis may run essentially through the center of the acceleration sensor, so that when the actuating element is rotated, symmetrical sensor signals are generated by the two measuring axes of the acceleration sensor with regard to the actuation axis.

According to one specific embodiment, it is provided that the at least biaxial acceleration sensor is configured for measuring the gravitational acceleration during the rotation of the actuating element, the control device having an evaluation unit coupled to the acceleration sensor, which is configured for determining the rotation of the actuating element in relation to the direction of the gravitational acceleration. Rotation angle φ, by which the actuating element is rotated about the actuation axis, may be calculated with the aid of the evaluation unit using an arc tangent function and/or the function "a tan 2(x, y)," where "x" and "y" denote the two measuring axes of the biaxial acceleration sensor. In this connection, Cartesian coordinates (x', y') of the biaxial acceleration sensor are converted into polar coordinates, so that rotation angle φ must be determined directly. Function "a tan 2 (x, y)" calculates rotation angle φ whose tangent is the quotient of "x" and "y," where in particular the following applies:

$$\text{atan2}(x, y) := \begin{cases} \arctan\left(\frac{x}{y}\right) & \text{for } x > 0 \\ \arctan\left(\frac{x}{y} + \pi\right) & \text{for } x < 0, y \geq 0 \\ \arctan\left(\frac{x}{y} - \pi\right) & \text{for } x < 0, y < 0 \\ +\frac{\pi}{2} & \text{for } x = 0, y > 0 \\ -\frac{\pi}{2} & \text{for } x = 0, y < 0 \\ 0 & \text{for } x = 0, y = 0 \end{cases}$$

Advantageously, the function "a tan 2(x, y)" makes it possible to calculate rotation angle φ in the corresponding quadrant.

According to one specific embodiment, it is provided that the evaluation unit has a low pass filter for filtering sensor signals of the acceleration sensor. This advantageously makes the control device robust to vibrations. Alternatively, it is also conceivable that the low pass filter is directly integrated into the acceleration sensor.

According to one specific embodiment, it is provided that the actuating element is manually translationally movable in parallel to the actuation axis in relation to the base element, and the acceleration sensor includes a triaxial acceleration sensor, an acceleration of the actuating element in parallel to the actuation axis being detectable with the aid of an additional sensing axis of the acceleration sensor perpendicular to the sensing plane. Advantageously, a translational movement creates an additional control functionality, which is also detectable using the acceleration sensor which is in this case configured as a triaxial unit. In this connection, the control device may function as a rotary knob as well as a pressure switch.

According to one specific embodiment, it is provided that the actuating element is manually tiltable in relation to the base element about a tilting axis running essentially perpendicularly to the actuation axis and to the gravitational field, the acceleration sensor including a triaxial acceleration sensor for measuring a tilt movement of the actuating element about the tilting axis. Advantageously, a translational movement creates additional control functionalities, which are also detectable using the acceleration sensor which is in this case configured as a triaxial unit. In this connection, the control device may function as a rotary knob as well as a toggle switch. It is conceivable that the control device further functions as a pressure switch and the actuating element may be moved translationally.

Another object of the present invention is a method for operating a control device, a rotation of the actuating element about the actuation axis being detected by the acceleration sensor. In particular as a function of the detected rotation, a sensor signal proportional to the rotation is generated, which is used for controlling the electrical and/or electronic device. Advantageously, the rotation is detected and quantified solely as a function of the sensor signal of the acceleration sensor, so that no sliding contacts subject to wear are needed and a comparatively cost-effective and power-saving control device may be implemented.

According to one specific embodiment, it is provided that the gravitational acceleration is measured with the aid of the acceleration sensor, and the orientation of the actuating element in relation to the direction of the gravitational acceleration is determined with the aid of an evaluation unit. Rotation angle $\varphi$, by which the actuating element is rotated about the actuation axis, may be calculated for this purpose with the aid of the evaluation unit using an arc tangent function and/or the function "a tan 2(x, y)," where "x" and "y" denote the two measuring axes of the biaxial acceleration sensor. Cartesian coordinates (x', y') of the biaxial acceleration sensor are converted into polar coordinates, so that rotation angle $\varphi$ must be determined directly.

According to one specific embodiment, it is provided that a translational movement of the actuating element parallel to the actuation axis is measured with the aid of the acceleration sensor, and/or a tilt movement of the actuating element about a tilting axis, perpendicular in each case to the actuation axis and to the gravitational acceleration, is measured with the aid of the acceleration sensor. Additional control functionalities may be implemented in this way, without additional sensor units being required.

Exemplary embodiments of the present invention are represented in the drawings and are elucidated in greater detail in the following description.

DETAILED DESCRIPTION

Figure 1:
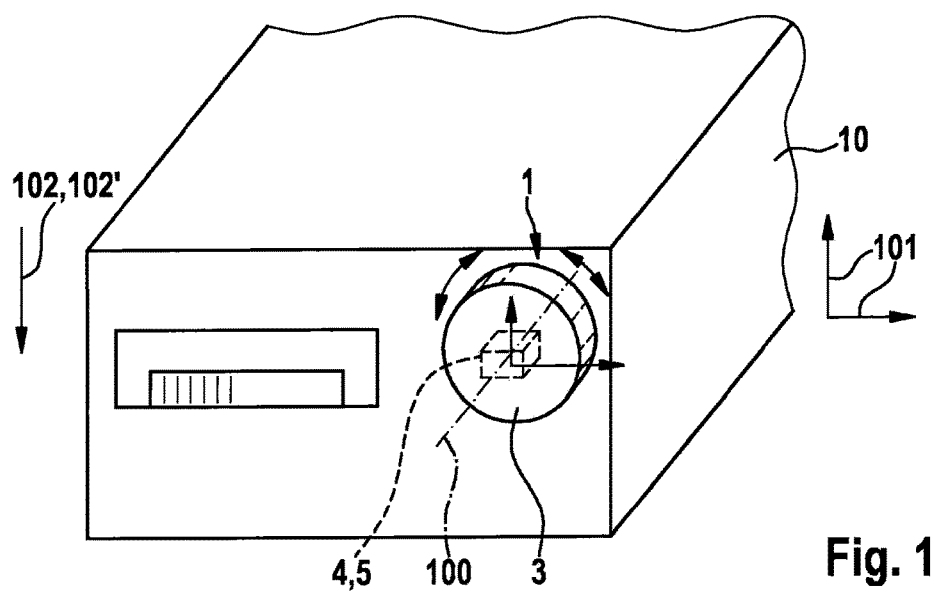
FIG. 1 shows a schematic view of a control device according to a first specific embodiment of the present invention.

Identical components are consistently provided with the same reference numerals in the various drawings and are therefore normally named or mentioned only once.

A schematic view of a control device 1 according to a first specific embodiment of the present invention is shown in FIG. 1. Control device 1 has an actuating element 3 to be operated manually by a user, the actuating element being rotatable about an actuation axis 100 in relation to a base element 2 configured as a friction bearing. Actuating element 3 is coupled non-rotatably via an axle 7 to a printed circuit board 8, a sensor unit 4 in the form of an at least biaxial micromechanical acceleration sensor 5 being situated on printed circuit board 8. Acceleration sensor 5 is coupled to an evaluation unit 6 via printed circuit board 8 and a flexible electrical conductor 9, for example, a flexible ribbon conductor, evaluation unit 6 being situated on a printed circuit board 11.

Control device 1 is used in particular for operating or controlling an electrical and/or electronic device (not shown). Actuating element 3 also has a stop 12, which interacts with a fixed counter-stop 13, to limit the rotation of actuating element 3 in relation to base element 2 to a defined maximum dimension, for example, 270 degrees. In this way, conductor 9 is also prevented from being pulled off. The friction bearing may have a certain friction in order to implement a haptically pleasant rotation for the user and convey a sensation to the user that it is not possible for the rotary setting of the actuating element to be inadvertently slipped out of position.

Acceleration sensor 5 is situated in such a way that a sensing plane 101 spanned by the two measuring axes of acceleration sensor 5 runs essentially parallel to gravitational field 102 and perpendicular to actuation axis 100. Gravitational acceleration (1g) 102' is now constantly applied to acceleration sensor 5, the direction of which is measured by acceleration sensor 5. When actuating element 3 is rotated, acceleration sensor 5 is rotated with it, so that from the perspective of acceleration sensor 5, the direction of gravitational acceleration 102' in sensing plane 101 migrates about actuation axis 100. The corresponding sensor signals with respect to the two measuring axes are converted by evaluation unit 6 from Cartesian coordinates into polar coordinates, so that a rotation angle $\varphi$, about which actuating element 3 was rotated, must be determined.

As a function of this rotation angle $\varphi$, in particular a control signal for controlling the electrical and/or electronic device is then generated. The electrical and/or electronic device includes, for example, an audio device, a computer, a communication device, a navigation device, an electronic vehicle control system or the like. The polar coordinates may be calculated with the aid of function "a tan 2(x, y)," where "x" and "y" denote the two measuring axes. Function "a tan 2(x, y)" calculates rotation angle $\varphi$ whose tangent is the quotient of "x" and "y," where in particular the following applies:

$$\operatorname{atan2}(x, y) := \begin{cases} \arctan\left(\frac{x}{y}\right) & \text{for } x > 0 \\ \arctan\left(\frac{x}{y} + \pi\right) & \text{for } x < 0, y \geq 0 \\ \arctan\left(\frac{x}{y} - \pi\right) & \text{for } x < 0, y < 0 \\ +\frac{\pi}{2} & \text{for } x = 0, y > 0 \\ -\frac{\pi}{2} & \text{for } x = 0, y < 0 \\ 0 & \text{for } x = 0, y = 0 \end{cases}$$

In order to make control system 1 resistant to vibration, a low pass is situated either in acceleration sensor 5 itself or in evaluation unit 6. This also advantageously reduces the noise in the sensor signal. In order to prevent undesirable "dithering" of the setting between adjacent values, a hysteresis threshold may also be implemented in evaluation unit 6, so that a change of the setting is effective only above a certain amount. In other words: The change of the sensor signals must exceed a certain amount in order for these changes to be also considered in the control signal.

Figure 2:
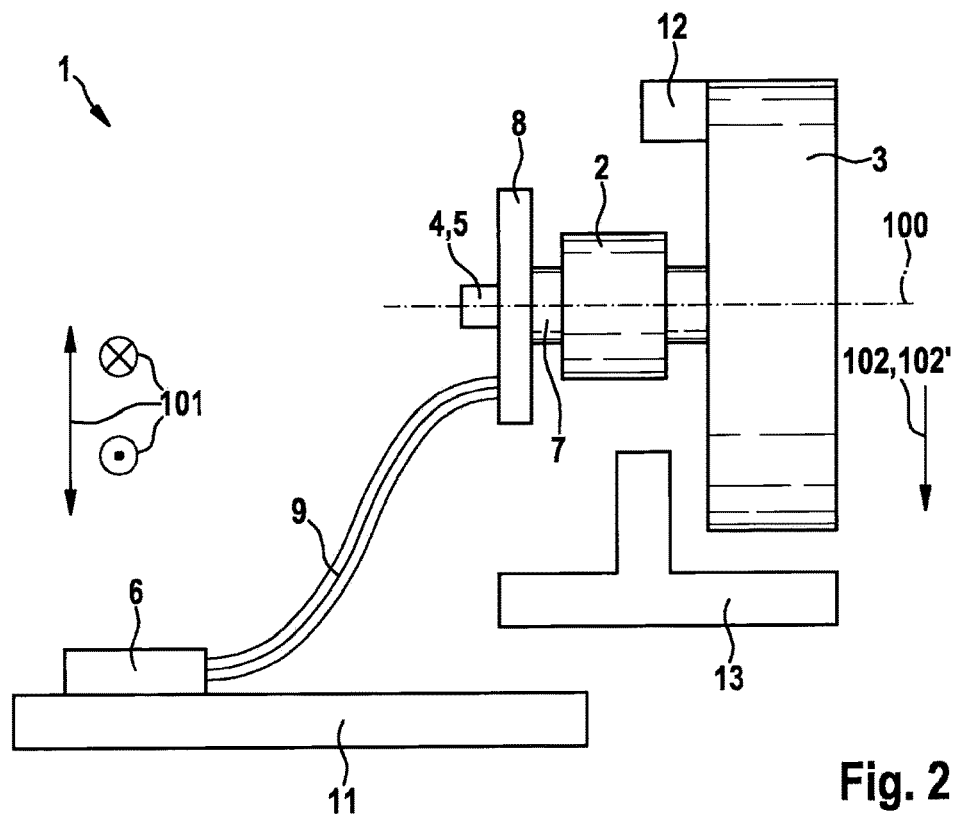
FIG. 2 shows a schematic view of a control device according to a second specific embodiment of the present invention.

A schematic view of a control device 1 according to a second specific embodiment of the present invention is shown in FIG. 2. The second specific embodiment is essentially similar to the first specific embodiment illustrated in FIG. 1, although in contrast to the first specific embodiment, a triaxial acceleration sensor 5 is implemented as sensor unit 4 in the second specific embodiment. Moreover, in relation to base element 2, actuating element 3 may additionally be moved along actuation axis 100, in particular against a spring force or the elasticity of the structure. The additional third measuring axis also runs parallel to actuation axis 100, so that an acceleration of actuating element 3 along actuation axis 100 generates a corresponding additional sensor signal. This additional sensor signal is also used for controlling the electrical and/or electronic device. It is conceivable that a tap signal is generated in this way.

The corresponding additional sensor signal is evaluated, in particular upstream of the low pass filter and/or the hysteresis threshold filtering. It is conceivable that an interrupt functionality integrated into acceleration sensor 5 is used for this purpose, the interrupt functionality generating or outputting an interrupt when a threshold value has been exceeded.

Figure 3:
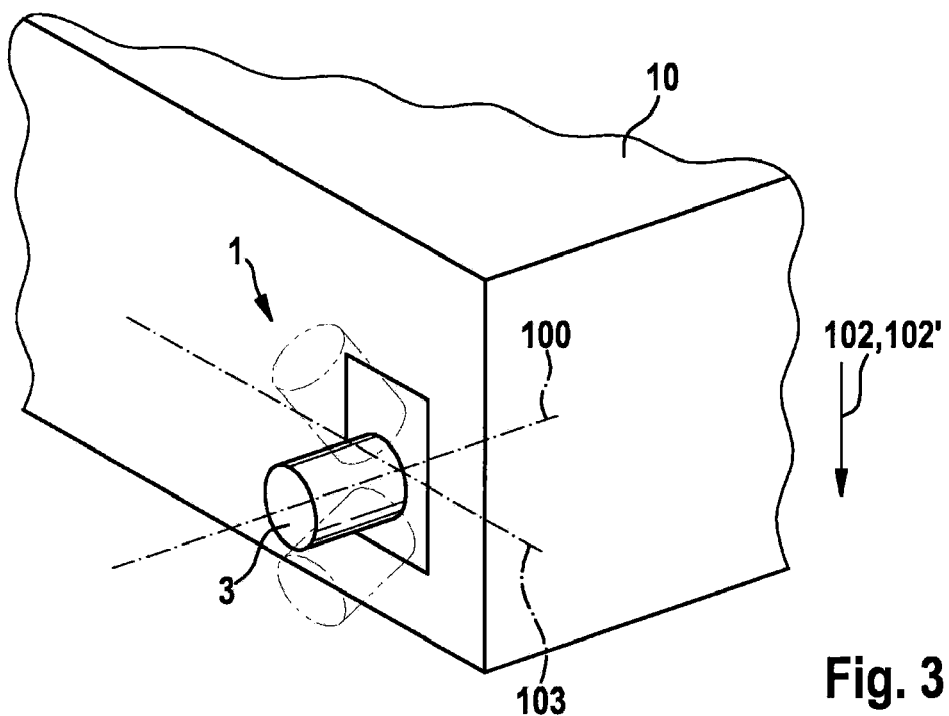
FIG. 3 shows a schematic view of a control device according to a third specific embodiment of the present invention.

A schematic view of a control device 1 according to a third specific embodiment of the present invention is shown in FIG. 3. The third specific embodiment is essentially similar to the first specific embodiment illustrated in FIG. 1, although in contrast to the first specific embodiment, a triaxial acceleration sensor 5 is again implemented as sensor unit 4 in the third specific embodiment, and actuating element 3 is additionally tiltable in relation to base element 2 about a tilting axis 103. Tilting axis 103 runs, for example, perpendicularly to gravitational field 102 and actuation axis 100. The additional third measuring axis runs parallel to actuation axis 100, so that an acceleration of actuating element 3 along actuation axis 100 due to a tilt of actuating element 3 about tilting axis 103 may be detected. In this way, two or more flip-flops of actuating element 3 may be detected, which then make other functions of the control device possible. It is also conceivable that a continuous tilting about tilting axis 103 is provided.

What is claimed is:

1. A control device for an electrical/electronic device, comprising:
a base element;
an axle which is rotatable in relation to the base element;
an actuating element which is manually rotatable in relation to the base element about an actuation axis, wherein the axle is rotatable about the actuation axis, and wherein the actuating element is coupled non-rotatably to a first end of the axle;
a sensor unit for detecting a movement of the actuating element about the actuation axis, wherein the sensor unit includes an acceleration sensor, and wherein the sensor unit is coupled non-rotatably to a second end of the axle so that the actuating element is coupled non-rotatably via the axle to the sensor unit.

2. The control device of claim 1, wherein the acceleration sensor includes at least one biaxial acceleration sensor, whose sensing axes run in a sensing plane perpendicular to the actuation axis, the sensing plane running essentially parallel to a gravitational field at least during the use case of the control device.

3. The control device of claim 2, wherein the actuation axis, with regard to the sensing plane runs essentially through the center of the acceleration sensor.

4. The control device of claim 2, wherein the at least one biaxial acceleration sensor is configured for measuring a gravitational acceleration during the rotation of the actuating element, further comprising:
an evaluation unit coupled to the biaxial acceleration sensor, which is configured for determining the rotation of the actuating element in relation to the direction of the gravitational acceleration.

5. The control device of claim 4, wherein the evaluation unit includes a low pass filter for filtering sensor signals of the acceleration sensor.

6. The control device of claim 1, wherein the actuating element is manually translationally movable in parallel to the actuation axis in relation to the base element, and wherein the acceleration sensor includes a triaxial acceleration sensor, an acceleration of the actuating element parallel to the actuation axis being detectable with the aid of an additional sensing axis of the acceleration sensor perpendicular to the sensing plane.

7. The control device of claim 1, wherein the actuating element is manually tiltable in relation to the base element about a tilting axis running essentially perpendicularly to the actuation axis and to the gravitational field, the acceleration sensor including a triaxial acceleration sensor for measuring a tilt movement of the actuating element about the tilting axis.

8. A method for operating a control device, the method comprising:
detecting a rotation of an actuating element about an actuation axis by an acceleration sensor;
wherein the control device is for an electrical/electronic device, including a base element; an axle which is rotatable in relation to the base element; the actuating element, which is manually rotatable in relation to the base element about an actuation axis, wherein the axle is rotatable about the actuation axis, and wherein the actuating element is coupled non-rotatably to a first end of the axle; and the sensor unit, which is for detecting a movement of the actuating element about the actuation axis, wherein the sensor unit includes the acceleration sensor, and wherein the sensor unit is coupled non-rotatably to a second end of the axle so that the actuating element is coupled non-rotatably via the axle to the sensor unit.

9. The method of claim 8, wherein a gravitational acceleration is measured with the aid of the acceleration sensor and the orientation of the actuating element in relation to the direction of the gravitational acceleration being determined with the aid of an evaluation unit.

10. The method of claim 8, wherein a translational movement of the actuating element in parallel to the actuation axis is measured with the aid of the acceleration sensor, and/or a tilt movement of the actuating element about a tilting axis, perpendicular in each case to the actuation axis and to the gravitational acceleration, being measured with the aid of the acceleration sensor.

11. The control device of claim 1, further comprising:
an evaluation unit for generating a control signal for controlling the electrical/electronic device based on sensor signals generated by the acceleration sensor.

12. The method of claim 8, the method further comprising:
generating, by an evaluation device, a control signal for controlling the electrical/electronic device based on sensor signals generated by the acceleration sensor.

13. The control device of claim 11, wherein the sensor signals correspond to at least two measuring axes; and wherein the sensor signals are converted from Cartesian coordinates into polar coordinates by the evaluation unit.

14. The method of claim 12, wherein the sensor signals correspond to at least two measuring axes; and wherein the sensor signals are converted from Cartesian coordinates into polar coordinates by the evaluation unit.

15. The control device of claim 13, wherein the control signal is generated as a function of the rotation angle.

16. The method of claim 14, wherein the control signal is generated as a function of the rotation angle.

17. The control device of claim 1, wherein the control device is a rotary knob.

18. The method of claim 8, wherein the control device is a rotary knob.

19. The control device of claim 1, wherein the actuating element is manually movable in a direction at least one of towards and away from the base element.

20. The method of claim 8, wherein the actuating element is manually movable in a direction at least one of towards and away from the base element.

21. The control device of claim 1, further comprising:
an evaluation unit for generating a control signal for controlling the electrical/electronic device based on sensor signals generated by the acceleration sensor;
wherein the acceleration sensor includes at least one biaxial acceleration sensor, whose sensing axes run in a sensing plane perpendicular to the actuation axis, the sensing plane running essentially parallel to a gravitational field.

22. The method of claim 8, wherein the acceleration sensor includes at least one biaxial acceleration sensor, whose sensing axes run in a sensing plane perpendicular to the actuation axis, the sensing plane running essentially parallel to a gravitational field; and the method further comprises:
generating, by an evaluation device, a control signal for controlling the electrical/electronic device based on sensor signals generated by the acceleration sensor.

* * * * *